Nov. 10, 1953  H. SMITH  2,658,704
OUTLET BOX HOLDER
Filed July 29, 1950  2 Sheets-Sheet 1
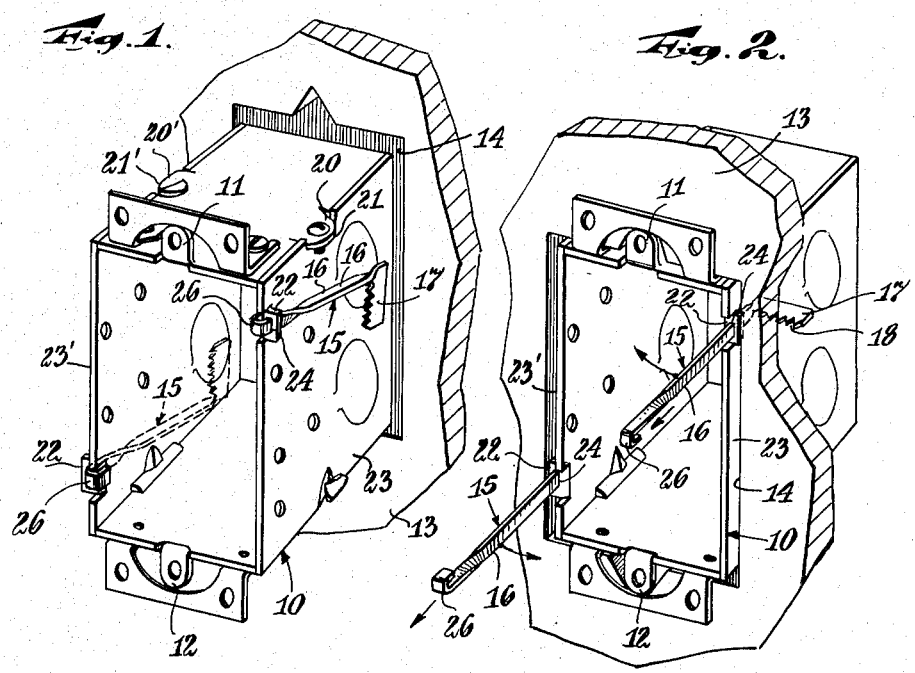
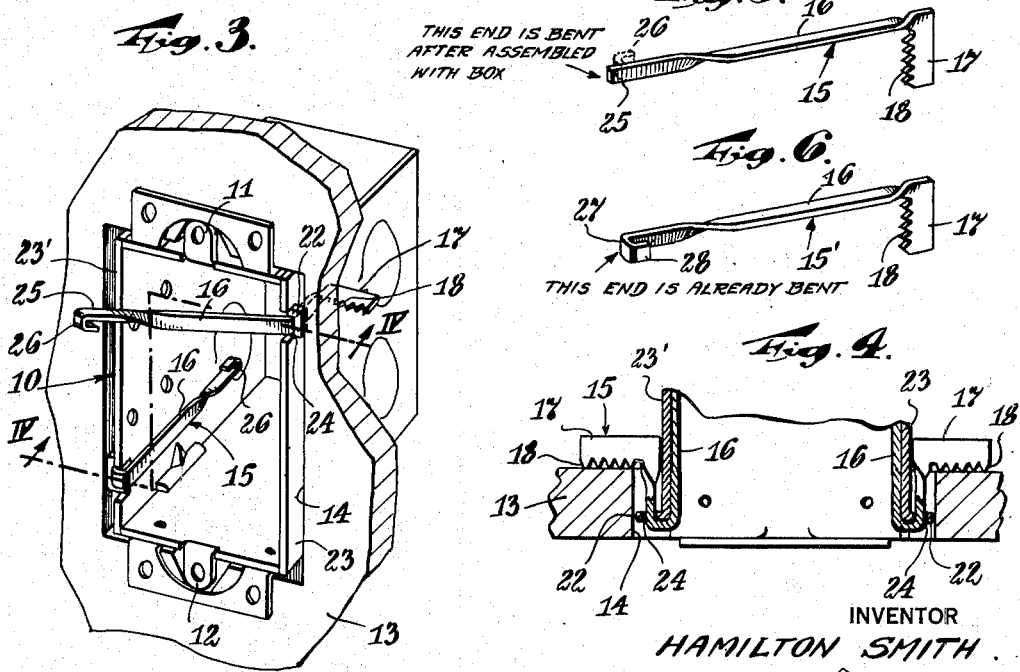
INVENTOR
HAMILTON SMITH
BY
ATTORNEY Nov. 10, 1953    H. SMITH    2,658,704
OUTLET BOX HOLDER
Filed July 29, 1950    2 Sheets-Sheet 2

INVENTOR
HAMILTON SMITH.
BY
ATTORNEY

Patented Nov. 10, 1953

2,658,704

UNITED STATES PATENT OFFICE 2,658,704

OUTLET BOX HOLDER

Hamilton Smith, Clifton, N. J.

Application July 29, 1950, Serial No. 176,683

5 Claims. (Cl. 248—27)

1

The present invention relates to junction or outlet boxes and relates more particularly to means for quickly and conveniently attaching a box in a wall aperture.

The difficulty of securing an outlet box in its proper position in a wall aperture is well recognized and many devices have been proposed for this purpose. Although the advantage to be gained by a practical device to meet variation in wall thickness and ease of instalation, has been met to some degree, the need for a low cost and effective device has not been satisfied. In most cases where a bracket of low cost is provided the difficulty in handling has offset the economic gain. In cases where more elaborate means are employed the cost of the device is prohibitive.

It is an object of the present invention to provide a simple and effective outlet box holding device with a minimum number of parts.

Another object of the invention is to provide holding means which may be either a permanent part of an outlet box or be readily applied to the box when required.

Other objects and advantages of the invention will be evident from the following description together with the accompanying drawing, in which Fig. 1 is a perspective view of a receptacle or outlet box provided with means constructed in accordance with my invention and in position to be inserted in a wall aperture;

Fig. 2 is a view similar to Fig. 1 but shows the outlet box inserted in the wall aperture ready to be secured in place;

Fig. 3 is a view similar to Fig. 2 and shows the outlet box secured in position;

Fig. 4 is a view taken on line IV—IV in Fig. 3;

Fig. 5 shows a gripper member as constructed to be permanently attached to an outlet box;

Fig. 6 shows a gripper member which may be separate from the outlet box and applied if required.

2

Figure 7:
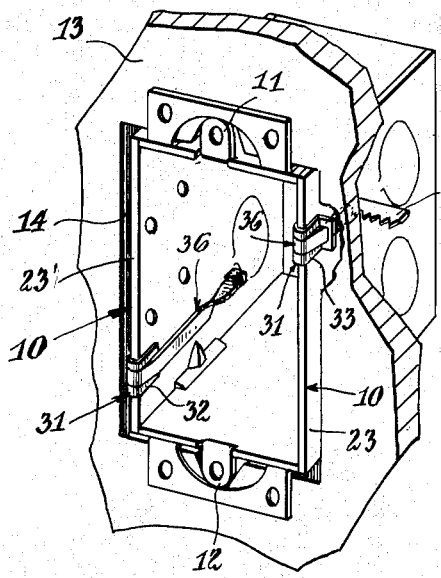
Fig. 7 is a view similar to Fig. 3 but shows a removable guide bracket for the gripper members.

The drawing shows a practical embodiment of the invention as applied to an outlet box 10. This box may be of any standard type provided with the usual upper extensions or ears 11 and lower ears 12 ordinarily used to secure the box to the wall 13 when provided with aperture 14 to receive the box.

When conditions are favorable as in new work the box may be secured to the wall by means of the ears 11 and 12. In many cases, however, as when replacing a box it becomes difficult to secure the ears to a metal lath, plaster or tile wall. In such cases it becomes necessary to provide a holding bracket and as stated above many such brackets have been proposed.

In accordance with the present invention holding or gripper members 15 of like construction are provided. As will be noted each gripper member has an elongated member or arm 16 terminating at one end in a gripper jaw 17 provided with a row of teeth 18 extending laterally from and disposed at right angles to the normal inner end of arm 16.

The arm 16 is rectangular in transverse cross-section and is preferably of greater width than thickness and is substantially in the form of what may be termed a flat metallic strip.

Adjacent to the other end of the arm 16 the strip is twisted about its longitudinal axis to bring the narrow edges of the strip in planes parallel to the wider surface of the strip to provide a twist of ninety degrees forming spiral portions for purposes to be described.

As stated, in cases where it is not practical to use the ears of an outlet box to attach it to a wall the box must be secured by other means such as a clamp or bracket engaging inner surfaces of the wall and the present invention therefore provides gripper members 15. It will be evident however, that the wall aperture 14 must be made of such dimensions as to just clear the greatest dimension of the outlet box to be secured.

The present invention takes advantage of the fact that a standard outlet box 10 includes projections which extend from the surface of the box a short distance such as lugs 20 and 20' and lugs 21 and 21'. The boxes are usually made in two sections and locked together by a screw passing through lugs 20 and 20' and by interlocking lugs 21 and 21'. Thus the aperture 14 must be wide enough to pass the ears and lugs of the box, thereby providing space for the gripper members in the manner to be described. In accordance with the present invention the gripper members 15 cooperate with the box to secure the latter in place. The box therefore may be provided with guide flanges 22 bent from the sheet metal sides 23 and 23' of the box. Obviously the guide flanges may, if desirable be first shaped and welded in proper position on the box wall. Each guide flange is provided with a guide slot in the form of a rectangular aperture 24 of slightly greater area than the area of a transverse cross-section of an arm 16 of a gripper member.

An end 25 of a gripper member such as the member shown in Fig. 5 is inserted through aperture or guide slot 24 to position the jaw 17 adjacent to the rear end of the box and in a plane parallel to the box wall. The extreme end 26 is bent at a right angle to arm 16 as shown in Figs. 1 to 3 to prevent accidental removal. The gripper member may thus be disposed with jaw 17 flat against a wall of the box and in position to pass through aperture 14 as the box is inserted in the aperture 14.

When the box has been positioned in the wall aperture the jaw 17 will be disposed beyond the inner surface of the wall.

The bent end 26 of arm 16 of the gripper member is then grasped and the arm is pulled outward. This movement causes the arm 16 to slide through guide slot 24. As the arm moves outwardly the twist or thread-like formation of the arm 16 results in a rotary movement thereof causing the jaw 17 to take a quarter turn. Thus as the jaw moves toward the inner surface of the wall the teeth 18 engage the wall and the arm 16 may be pulled out until the box is tightly held between the jaw 17 and the ears 11 on the box. The arm may then be bent over as shown in Fig. 3 to lock the box in position with the jaw gripping the inner surface of the wall.

The gripper members when applied to the boxes as above set forth become permanent parts of the box which may be sold with the gripper members as part of the outlet box.

If, however, it is desirable the boxes need only be provided with the guide lugs 22 in which the gripper members as 15' (Fig. 6) are disposed with an end 27 provided with a bend 28 opposite to that of gripper member 15.

In this case the gripper member may be a separate item and sold for use with boxes having the guide lugs. The end 28 of the gripper member may be passed through the guide lug and the operation of securing the box in place will be the same as above described.

Although the present invention may be practiced by having a guide 22 integral with box 10 a guide bracket 31 as shown in Figs. 7 to 10 may be employed. This guide bracket is in the form of a U-shape member 30 having arms 32 and 33 spaced apart a distance slightly less than the thickness of a wall of box 10 so that the bracket may frictionally engage a wall of the box when forced thereover. If desirable, however, the bracket may be made of spring steel and snapped in place.

Arm 33 of the bracket is provided with a guide lug 34 having a guide aperture 24' similar to the guide slot 24 of Fig. 1.

The bend or elbow of the bracket 31 is provided with a slot 35 so that when the bracket is in position on the wall of a box the edge of the wall will be exposed to receive arm 36 of gripper member 37 when the latter is bent over the edge of the box wall as shown in Fig. 7. It will be evident that the movement of jaw of gripper member 37 will be the same as shown in Figs. 1 and 2.

Figure 10:
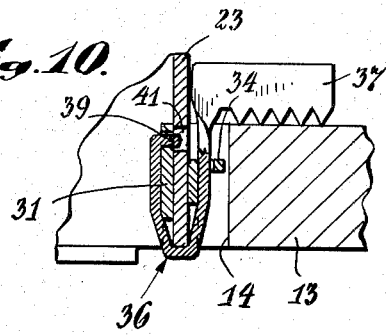
Fig. 10 is a cross-sectional view of a gripper member and guide bracket in position to hold a wall box in fixed relation to a wall.

When the bracket 31 is employed it may be attached to the arm 36 by passing the arm through slot 24' and the end 38 of the arm may be slightly widened or bent as shown to prevent accidental removal of the gripper member. The bracket and arm or gripper member may thus be sold as a unit. If desirable the arm 36 of bracket 31 may be provided with a short projection or lip 39 as shown in Fig. 10 to enter an aperture 41 such as provided in standard boxes of this type and hold the bracket against sidewise movement.

Figure 8:
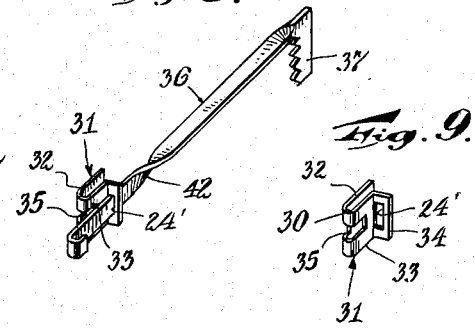
Fig. 8 is a perspective view of a gripper member and guide bracket.
Figure 9:
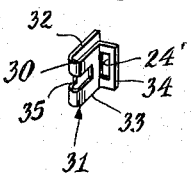
Fig. 9 is a perspective view of the guide bracket.

The gripper member as shown in Figs. 7 and 8 are provided with the twisted section 42 so that the action will be the same as in the case of the gripper jaw shown in Figs. 1 and 2 for example.

Figure 11:
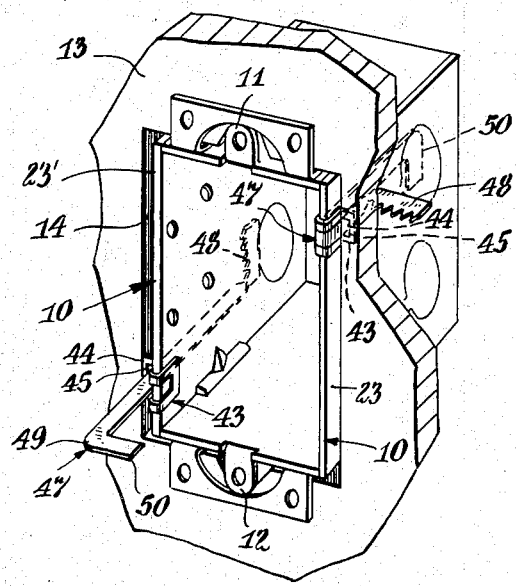
Fig. 11 is a perspective view of a wall box in position in a wall aperture showing a modified form of gripper member and guide bracket and Fig. 12 is a perspective view of a modification of the gripper arm shown in Fig. 11.

The present invention may, however, include a bracket 43 as shown in Fig. 11 having a flange 44 provided with an enlarged slot 45 to permit the turning of arm 46 of a gripper member 47. In this case the jaw 48 is, as in the previously described devices, turned flat against the wall of the box when the box is inserted in the wall aperture. When the box is in place the end 49 of gripper member 47 is grasped and turned until jaw 48 extends laterally to the wall of the box. The gripper member is then moved endwise until the jaw 48 contacts the inner surface of the wall after which the arm 46 is bent over the edge of the box wall as shown in Fig. 11. The position of extension 50 serves to indicate the position of the jaw 48 when in contact with wall 13.

Figure 12:
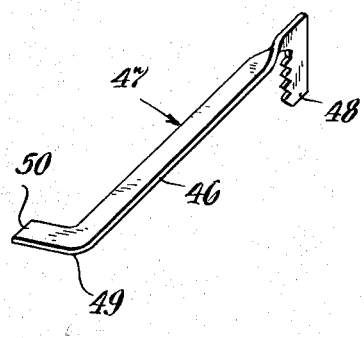

In the structure shown in Figs. 11 and 12 the same result is attained except that the user notes the position of extension 50 thereby locating the position of the jaw 48 perpendicular to the surface of the wall whereas with the gripper member shown in Figs. 5 and 8 for example the gripper arm is automatically turned to the proper position for the fastening operation.

Although a preferred embodiment of the invention is shown and described herein, it is to be understood that modifications may be made therein without departing from the spirit and scope of the invention as set forth in the appended claims.

What is claimed is:

1. A retainer member for an electrical outlet box having an extension provided with a guide slot, said member comprising a metallic strip slidably fitting said guide slot, said strip having a spiral portion intermediate its end portions, one end portion of the strip being in a plane perpendicular to the plane of the other end portion and a jaw member extending laterally from one end portion and disposed in the plane of the other end portion, said strip being movable endwise in said guide slot to cause said slot to engage said spiral portion to rotate said strip and position said jaw member in a given position relative to said box.

2. A holder for an electrical outlet box having lug members provided with non-circular slots, comprising slide members disposed for endwise movement in said slots, a gripper jaw at the end of each of said slide members, said jaws being disposed in a plane parallel to side walls of said box when the other ends of said slide members are adjacent to said lug members and means intermediate the ends of said slide members for causing said jaws to move perpendicular to outer surfaces of said box when said slide members are moved endwise in said slots, portions of said slide members engaging the perimeters of said slots to retain said jaws in said perpendicular relation to said sides of said box.

3. A holder for an electrical outlet box having lug members provided with rectangular slots, comprising slide members disposed for endwise movement in said slots, gripper jaws at ends of said slide members, said jaws being disposed in a plane parallel to the walls of said box when the other ends of said slide members are engaged by said slots, said slide members having spiral portions intermediate said ends for causing said jaws to move perpendicular to said walls when said slide members are moved endwise in said slots, portions of said slide members engaging the perimeters of said slots to retain the jaws in said perpendicular relation to said box walls.

4. A holder for an electrical outlet wall box comprising a bracket member, arms integral with said bracket member for securing said member to a wall of said box, a guide plate integral with said member and provided with a guide slot, a slide rod slidably fitting said slot and movable endwise therein, a jaw member extending laterally from one end of said slide rod and parallel to said box wall when said bracket is secured to said box and means on said slide rod intermediate its ends cooperating with the edges of said guide slot to rotate said slide rod to position said jaw member perpendicular to said box wall upon endwise movement of said slide rod, a portion of said slide rod cooperating with said guide slot to hold said jaw in said position relative to said box wall.

5. A holder for an electrical outlet wall box comprising a bracket member, means for securing said bracket to a wall of said box, a guide plate integral with said bracket member, said guide plate having a non-circular guide slot, a slide rod slidably fitting said guide slot and movable endwise therein, a gripper jaw at one end of said slide rod and disposed parallel to said box wall when said bracket member is secured to said box wall, said slide rod having a spiral portion intermediate its ends cooperating with the perimeter of said slot upon an endwise movement of said slide rod to rotate said slide rod and position said jaw member perpendicular to said box wall, a portion of said slide rod engaging the perimeter of said slot to hold said jaw in said position relative to said box wall.

HAMILTON SMITH.

References Cited in the file of this patent

UNITED STATES PATENTS

| Number | Name | Date |
|--------|------|------|
| 210,283 | Whittier | Nov. 26, 1878 |
| 877,268 | Van Buren | Jan. 21, 1908 |
| 1,003,985 | Coe | Sept. 26, 1911 |
| 1,028,499 | Schott | June 4, 1912 |
| 2,138,812 | Akers | Dec. 6, 1938 |
| 2,309,189 | Hancock et al. | Jan. 26, 1943 |
| 2,320,400 | Bedell | June 1, 1943 |
| 2,321,640 | Adkins | June 15, 1943 |
| 2,432,555 | Smith | Dec. 16, 1947 |
| 2,453,535 | Pallas | Nov. 9, 1948 |
| 2,586,728 | Shepard | Feb. 19, 1952 |